(12) United States Patent
Yuhas et al.

(10) Patent No.: US 7,191,091 B2
(45) Date of Patent: Mar. 13, 2007

(54) ADVANCED CABLE METROLOGY SYSTEM

(75) Inventors: Donald E. Yuhas, Glen Ellyn, IL (US);
James H. Voth, Sauk Centre, MN (US); Patrick Schneider, Leander, TX (US); Keith H. Foster, New Ulm, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 14 days.

(21) Appl. No.: 11/000,631

(22) Filed: Dec. 1, 2004

(65) Prior Publication Data

US 2006/0116852 A1 Jun. 1, 2006

(51) Int. Cl.
*G01B 15/00* (2006.01)
(52) U.S. Cl. .......................... 702/155; 702/40
(58) Field of Classification Search ............. 702/155
See application file for complete search history.

(56) References Cited

U.S. PATENT DOCUMENTS

| | | | | |
|---|---|---|---|---|
| 4,688,241 | A * | 8/1987 | Peugeot | 378/137 |
| 5,010,564 | A * | 4/1991 | Thomas | 378/176 |
| 6,649,914 | B1 * | 11/2003 | Moorman et al. | 250/363.06 |
| 2004/0184575 | A1 * | 9/2004 | Sikora | 378/50 |
| 2005/0094763 | A1 * | 5/2005 | Sherman et al. | 378/19 |

FOREIGN PATENT DOCUMENTS

EP 0 227 350 7/1987

OTHER PUBLICATIONS

"X-ray Measurement System" Industrial Measurement Systems, Inc. USA [on line], copyright 2004 Industrial Measurements Systems Inc., [retrieved from the internet on Aug. 16, 2004]. URL <http://www.imsysinc.com/ADMS1.htm>.
Memo titled "X-Ray Inspection System for Cable" dated Dec. 19, 1983.
Memo titled "Magnaflux On-Line Cable Acceptance" dated Sep. 12, 1986.
Proposal prepared for 3M Corporation dated Feb. 29, 1984.
Memo titled "Flat Cable Measurement" dated Apr. 29, 1983.
MAXIS 2.0 System Documentation dated Apr. 1993.
User Manual, MX 5862, Magnaflux Automatic X-Ray Inspection System (MAXIS), Magnaflux Advanced Research Laboratory, 2301 Arthur, Elk Grove Village, IL 60007.

* cited by examiner

Primary Examiner—John Barlow
Assistant Examiner—Jonathan Moffat
(74) Attorney, Agent, or Firm—Melanie G. Gover (57) ABSTRACT

The present invention is a method for determining the center to center spacing of conductors in an insulated, multi-conductor, flat cable. The method comprising applying an X-ray field to the cable, detecting the X-ray field intensity that passes through the cable, obtaining a digitized output waveform of the X-ray field intensity as a function of cable position, and determining a trough location of the waveform by averaging calculated position values for the center of the conductor at several longitudinal positions along a cross section of the conductor.

24 Claims, 9 Drawing Sheets

ADVANCED CABLE METROLOGY SYSTEM

FIELD

The present invention relates generally to the measuring of distance between conductors in insulated cable. In particular, this invention relates to measuring center to center distance of solid wire or stranded wire conductors in ribbon cable.

BACKGROUND

Ribbon cable consists of multiple wire conductors running parallel to each other concealed within an insulating sheath. The conductor wires in ribbon cable can be either solid or stranded. Stranded wire consists of multiple strands of wire twisted together to form a heavier gage wire.

It is advantageous to keep conductor spacing consistent throughout the length of the cable to achieve maximum cable performance and to achieve quality in manufacturing operations. Industry demands require cable with conductor spacing as small as 0.025 inch. Previously invented instruments that measure conductor spacing do not have accuracies known to be capable of measuring conductors with 0.025 inch center to center spacing. Thus, there is a need in the cable manufacturing industry for a system and method that is able to accurately measure ribbon cables with conductor center to center spacing as small as 0.025 inch.

Direct visual or optical measurement of the conductor spacing is not possible due to the insulating sheath. Therefore, methods have been developed using X-ray technology to measure the center to center distance.

European Patent Application number 86309429.8 by Shuttleworth et al. discloses a method and apparatus for measuring center to center spacing of conductors in ribbon cable. The system involves passing a ribbon cable between a photon source and a detector in order to obtain the X-ray signal emerging from the cable. The signal is electronically processed and the resulting output is a waveform. The center to center distance of the conductors is represented as the distance between the troughs in the waveform. The location of the center of each conductor is determined by first establishing threshold positions where the waveform crosses a predetermined reference level. The trough positions can then be estimated by calculating the mean of adjacent threshold positions.

There is a need in the cable industry for a system and method for more accurately determining center to center conductor spacing in insulated flat cables. There is also a need for a system that is capable of determining center to center conductor spacing in insulated flat cables that use stranded wire conductors.

SUMMARY

One aspect of the present invention is a method for determining the center to center spacing of conductors in an insulated, multi-conductor, flat cable. The method includes applying an X-ray field to the cable, detecting the X-ray field intensity that passes through the cable, obtaining a digitized output waveform of the X-ray field intensity as a function of cable position, and determining a trough location of the waveform by averaging calculated position values for the center of the conductor at several longitudinal positions along a cross section of the conductor.

DETAILED DESCRIPTION

Figure 1:
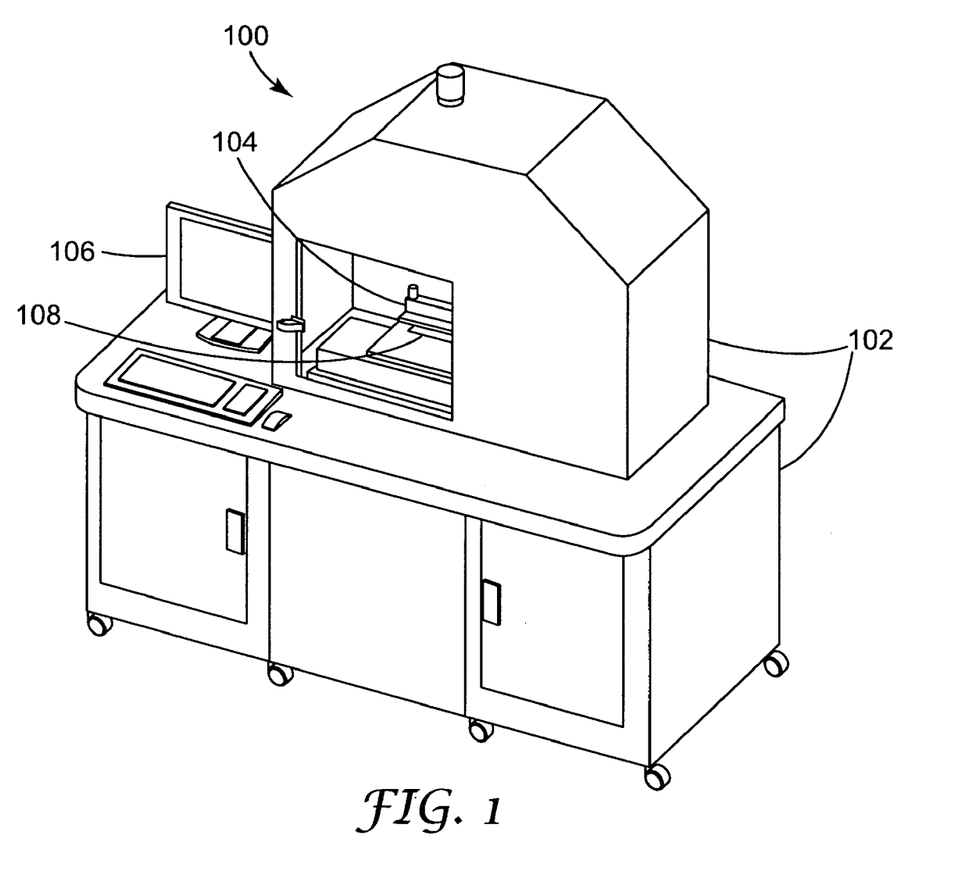
FIG. 1 is a perspective view of one embodiment of the present invention.

FIG. 1 is a perspective view of one embodiment of the present invention. An advanced cable metrology system (ACM system) 100 includes a cabinet 102 that houses the components of the system. Components of the ACM system 100 include a sample stage assembly 104 and a computer system 106. A cable sample 108 is placed in the sample stage assembly 104. The cabinet 102 is capable of providing adequate protection from X-ray radiation, yet provides access to the sample stage assembly 104 and the cable sample 108.

Figure 2:
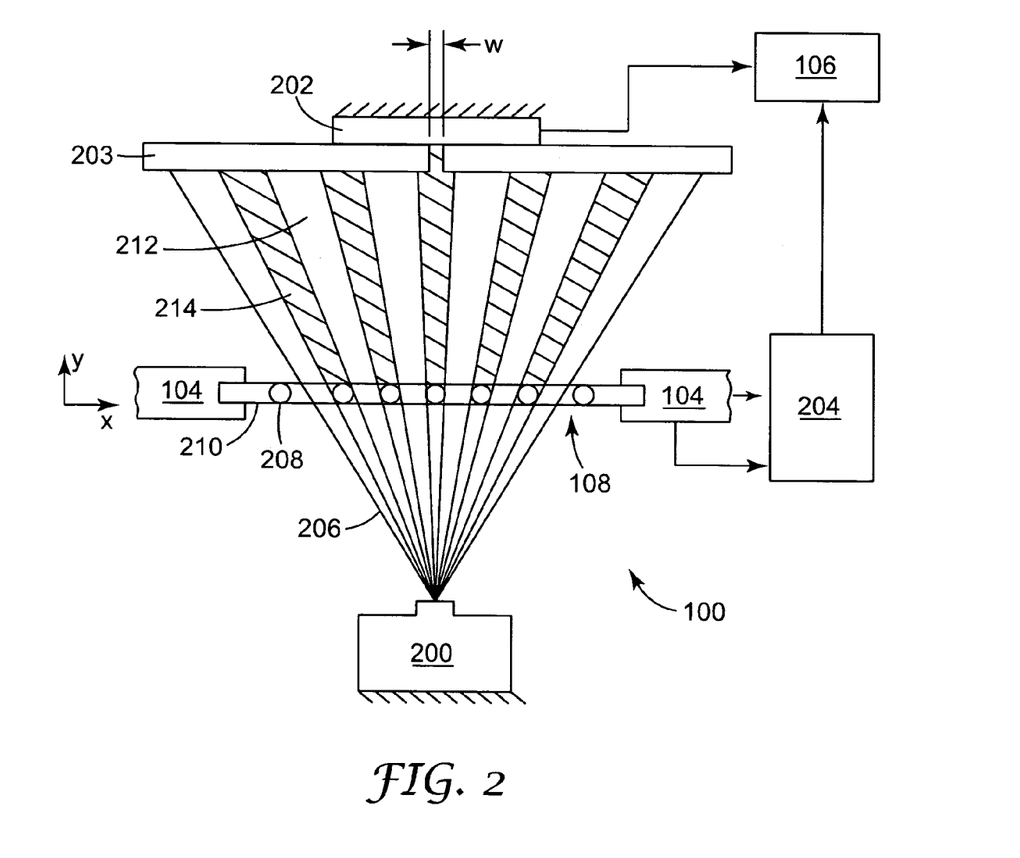
FIG. 2 is a diagram illustrating one embodiment of the operation of the system of the present invention.

FIG. 2 is a diagram illustrating one embodiment of the operation of the ACM system 100. The components of the system include the sample stage assembly 104, the computer system 106, an X-ray generator 200, a detector 202 having a detector aperture 203, and a linear motion system 204. The cable sample 108 is also shown. The X-ray generator 200 emits a diverging photon beam 206 aimed at the detector 202.

The wire cable sample 108 is placed in the photon beam 206. In one embodiment the cable sample 108 is a ribbon cable. The ribbon cable consists of multiple conductors 208 and an insulating sheath 210. The cable sample 108 is secured in place by the sample stage assembly 104. The cable sample 108 is moved in the x direction via the linear motion system 204. The detector 202 is connected to the computer system 106 for data collection and processing.

In one embodiment, the linear motion system 108 consists of a servo-motor positioner and a linear stage, where the linear stage is a precision ball screw stage capable of traveling up to 18" and has integrated limit and home position switches. In one embodiment, the computer system 106 includes a data acquisition board and an amplifier.

In one embodiment, the ACM system 100 is capable of measuring ribbon cable with center to center spacing of 0.025 inch. This is achieved by utilizing a small X-ray spot size and long focal length, and by controlling the geometry of the detector aperture 203. The X-ray generator 200 utilizes a point source capable of producing a 5 micron spot size and the detector 202 is a silicon photodiode covered by a scintillator. The width w of the detector aperture 203 affects the resolution and sensitivity of the detector 202. Maintaining a narrow width w results in better resolution and lower sensitivity. The length of the detector (along the length of the conductor 208, into the page in FIG. 2) also affects sensitivity. A smaller length results in lower sensitivity. A longer length can be maintained without affecting resolution along the width of the conductor 208. This allows the width w to be reduced to increase resolution without decreasing sensitivity. In one embodiment the ratio of length to width w is 7, with the width w being less than 5 millimeters to obtain magnification factors around 60. The magnification factor is based on the distance between the X-ray generator 200 and the conductor 208, and the distance between the detector 202 and the conductor 208. The geometry of the detector aperture 203 contributes to accurate readings of center to center spacing of stranded conductors. Also, the X-ray generator 200 and detector 202 remain stationary. These factors all contribute to a system with high resolution and high repeatability.

As the cable sample 108 passes through the photon beam 206, the detector 202 acquires the emerging X-ray intensity. The emerging X-ray intensity consists of a higher strength signal 212 where the photon beam 206 passes only through the insulating sheath 210 and a lower strength signal 214 where the photon beam 206 passes through the conductor 208 and the insulating sheath 210. As the cable sample 108 is passed through the photon beam 206, a waveform pattern is sensed by the detector 202 and recorded using the computer system 106.

Figure 3A:
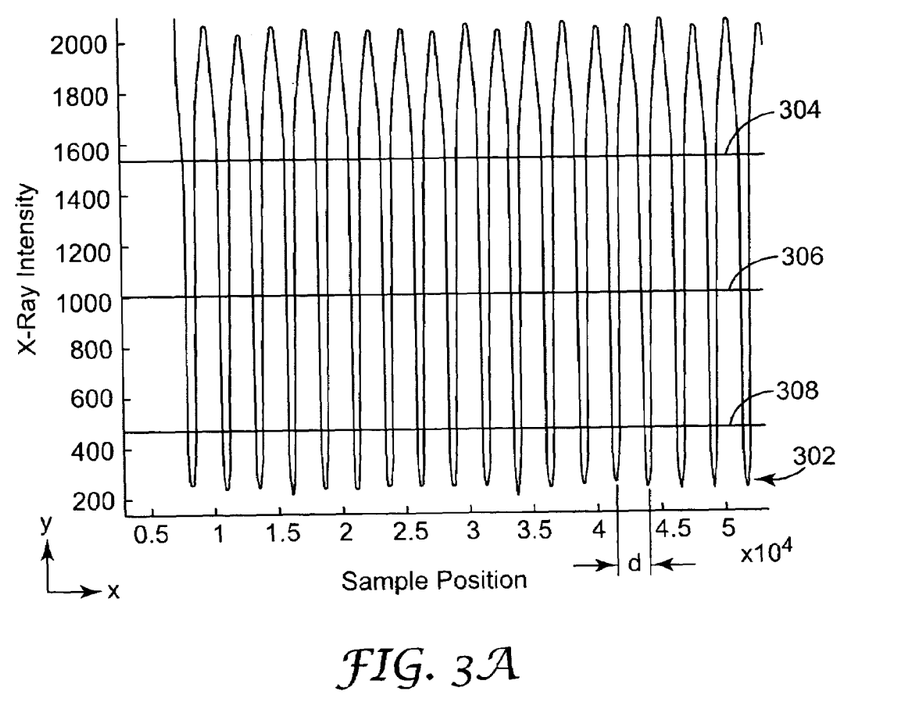
FIG. 3A is a plot of the detector input showing the perceived signal strength versus cable position.

FIG. 3A is a plot of the input of the detector 202 showing the perceived X-ray intensity versus the position of the cable sample 108 as displayed by the computer system 106. The plot shows the acquired X-ray intensity versus position of the cable sample 108 in the linear motion system 204. Troughs 302 in the plot are representative of the lower strength signal 214 in the shaded region in FIG. 2. The bottom of each trough 302 represents the center of each conductor 208 in the cable sample 108. A trough to trough distance d on the waveform is representative of the center to center distance between conductors 208. However, it is not adequate to simply read the trough position from the graph because this does not yield precise data. The trough is distorted because X-ray attenuation is highest at the thickest portion of the conductor 208. Accurate readings can be taken where the intensity signal versus cable position is changing, with more rapid change resulting in higher accuracy. This is spaced from the horizontal edge of the conductor 208, or spaced from the trough 302 of the waveform. The present invention utilizes this portion of the waveform where both the intensity and sample position values can be accurately read from the waveform.

Figure 3B:
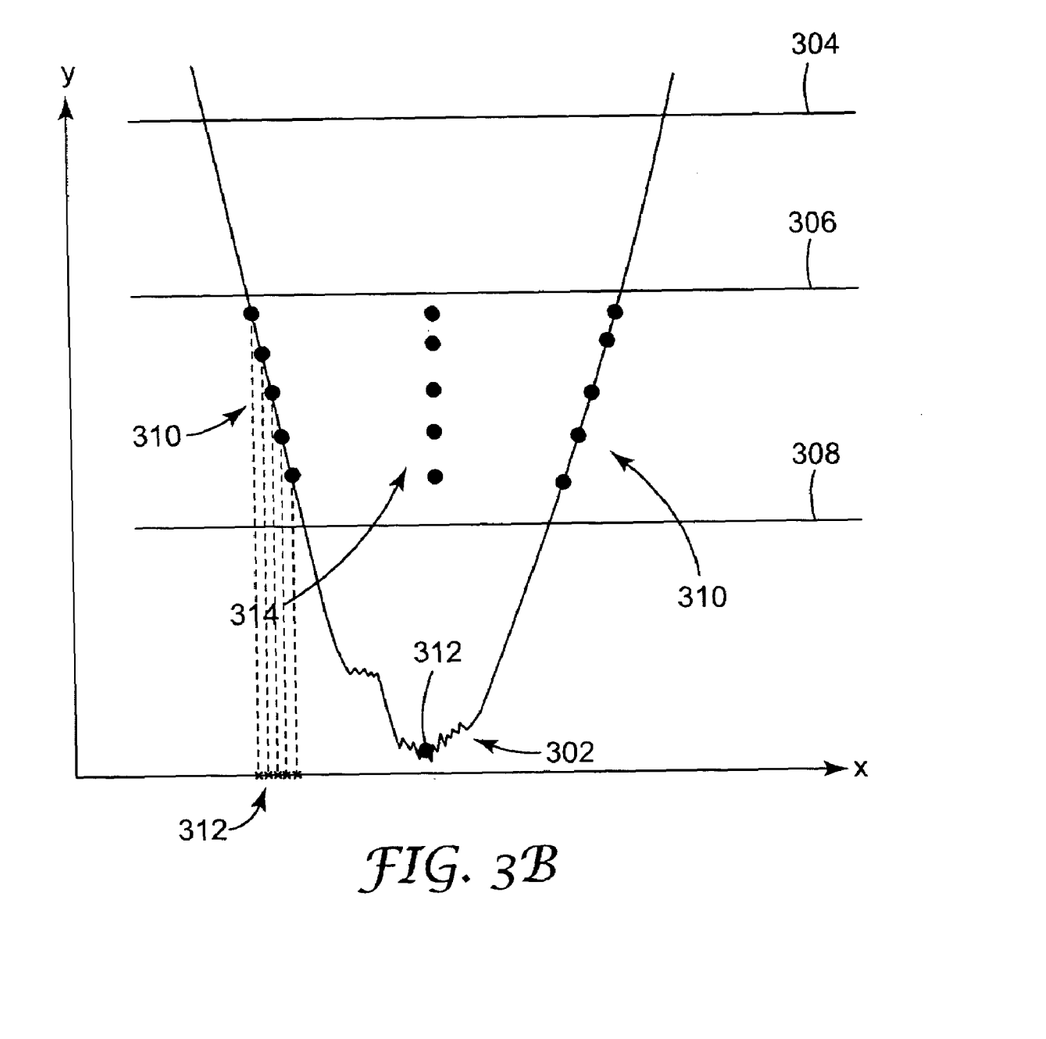
FIG. 3B is an enhanced view of a trough from the plot of the detector input where the method of the present invention is performed.

FIG. 3B is an enhanced view of a trough from the plot of the input of the detector 206 where the method of the present invention is performed. The method of the present invention allows for accurate determination of the trough to trough distance d. One embodiment of the method of the present invention involves determining a mean value 304 of the X-ray intensity for a plurality of the waveform oscillations. The mean value 304 of the X-ray intensity is calculated using the following equation, $$i_{mean} = \frac{\sum_{j=1}^{n} i_j}{n}$$ Equation [1]

where $i_{mean}$ is equal to the mean X-ray intensity, n is equal to the number of data points used, and i is equal to individual intensity levels.

The range of the X-ray intensity is next calculated by subtracting a minimum X-ray intensity from the mean value 304. The range is calculated using the following equation, $$R = i_{mean} - i_{min}$$ Equation [2]

where R is the range, $i_{mean}$ is the mean intensity value, and $i_{min}$ is the minimum intensity value from the waveform.

Then, an upper intensity level 306 and a lower intensity level 308 are determined. The upper and lower intensity levels are selected to be located on a region of the plot of the input of the detector 206 where the X-ray intensity versus the cable position exhibits a high rate of change. This range can be varied to meet the needs of specific applications. In one embodiment, the upper intensity level 306 and lower intensity level 308 are equal to sixty percent of the range plus the minimum X-ray intensity and twenty percent of the range plus the minimum X-ray intensity, respectively. For this embodiment, the upper and lower intensity levels can be determined using the following equations, $$I_{upper} = 0.6R + i_{min}$$ Equation [3]

$$I_{lower} = 0.2R + i_{min}$$ Equation [4]

where $I_{upper}$ is the upper intensity level, $I_{lower}$ is the lower intensity level, R is the range, and $i_{min}$ is the minimum intensity level. The upper intensity level 306 and lower intensity level 308 are shown in FIGS. 3A and 3B. The portion of the waveform between the upper intensity level 306 and the lower intensity level 308 represents a portion of the conductor where intensity level versus sample position is changing. The mean intensity value 304 is also shown in FIGS. 3A and 3B.

For each trough 302, five X-ray intensity levels 310 are selected between the upper intensity level 306 and the lower intensity level 308. For each intensity level a pair of y coordinates is selected as follows:

$$I_1 = y_{1a} = y_{1b}$$ Equation [5]

$I_1$ equals one intensity level selected between the upper and lower intensity levels. Here, $y_{1a}$ and $y_{1b}$ represent the y coordinates at that intensity level for one trough. For each of these values, the corresponding sample position values 312 on the x-axis are determined as follows:

$$i_{1a} = (x_1, y_{1a}), i_{1b} = (x_2, y_{1b})$$ Equation [6]

Here, $x_1$ and $x_2$ are the corresponding sample position coordinates for the intensity values at the selected intensity level, $I_1$. Each pair of sample position values is averaged together to determine individual averaged sample position values 314.

$$x_{1avg} = \frac{x_1 + x_2}{2}$$ Equation [7]

Here, $x_{1avg}$ is the calculated center position of the cable conductors and $x_1$ and $x_2$ are the cable position values for the first selected intensity level. Finally, as shown in the following equation, the five individual averaged sample position values 314 are averaged together to obtain a highly accurate estimate of the trough location 312.

$$P_{through} = \frac{\sum_{j=1}^{5} x_{javg}}{5}$$ Equation [8]

$P_{trough}$ is equal to the center position of the trough 302, which is equal to the center location of the conductor 208 in the cable sample 108.

The above stated method is able to find the center to center conductor distance in ribbon cable with both solid and stranded wire conductors. Stranded wire conductors do not have a "true side." A true side is a side of a conductor where there are no crevices or uneven surfaces that can alter the X-ray intensity. The X-ray intensity permeating the cable represents the thickness of the conductor. Any additional conductor thickness or voids created by the adjoining strands of wire in stranded conductors can alter the X-ray intensity, thereby cluttering resulting thickness measurements. Having a true side allows the photon beam 206 to uniformly penetrate the cable sample 108 and thus to present a true representation of the conductor thickness. Because of the multiple wires within stranded conductors, a true side is not present. The method of this invention is able to compensate for the crevices and voids in stranded conductors by performing the steps discussed above, thus presenting an accurate representation of the center location of the conductors.

Figure 4A:
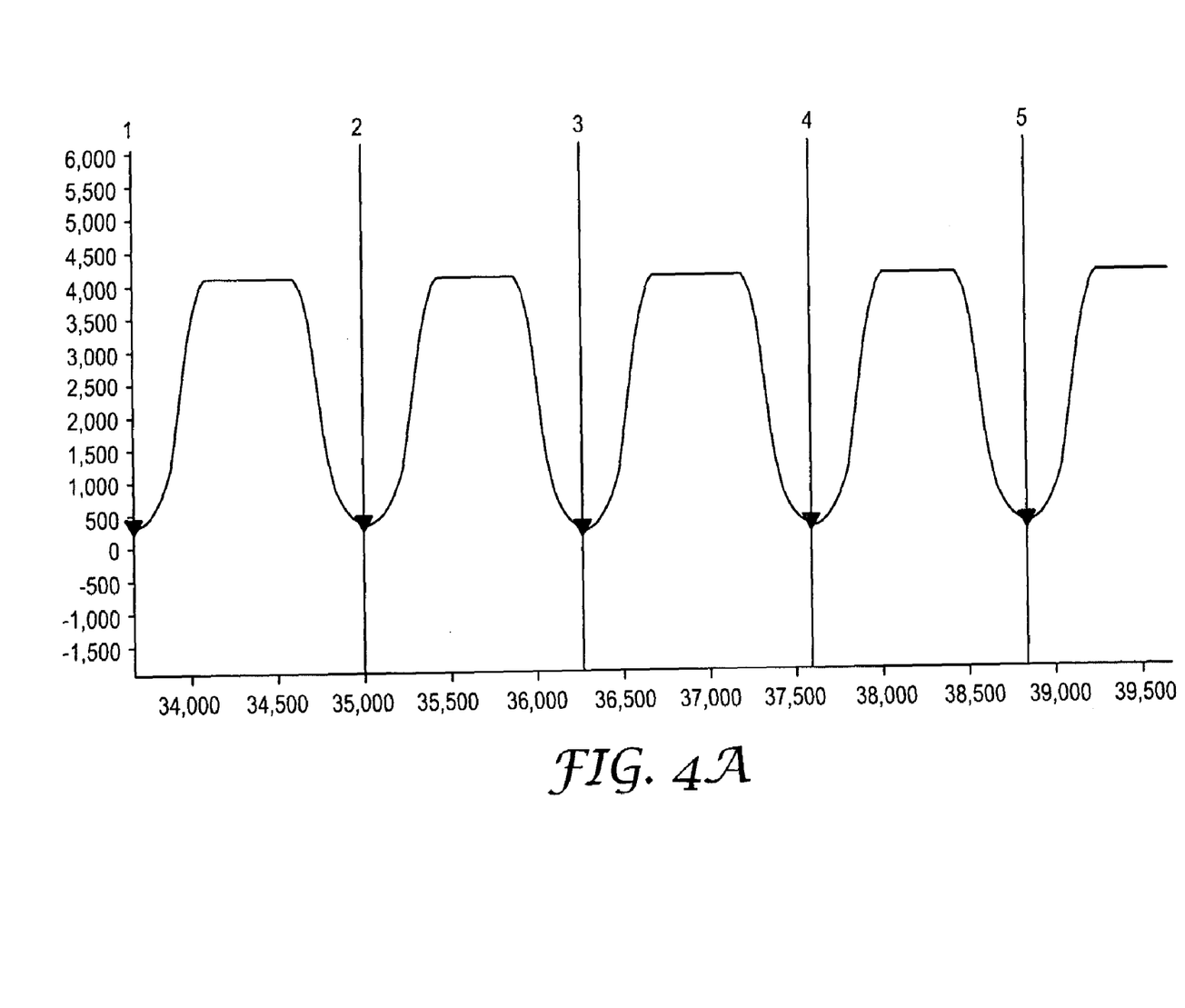
FIG. 4A illustrates a chart from a user interface display showing the raw data collected by the advanced cable metrology system.

FIG. 4A illustrates a chart from a user interface display showing the raw data collected by the ACM system 100. The system takes measurements of X-ray intensity every 0.0000025 inches. The X-ray intensity acquired by the detector 202 is amplified to enable use by the computer system 106. The computer system 106 utilizes a data acquisition board to convert the raw intensity signal to digital data.

The digitized data is pre-processed to eliminate noise from the data that is present in the ACM system 100. Pre-processing involves a down-sampling step and a filtering step. Down-sampling eliminates noise in the data by averaging five consecutive data points together to obtain one point representative of the five. This reduces the sample set by a factor of five. The filtering stage utilizes a Golay-Savitzy filter that takes small data segments and fits them to a square polynomial.

As shown in FIG. 4A, the processed data can then be presented on a display screen that is part of the computer system 106. The y-axis shows the intensity of the photon beam 206 passing through the cable sample 108. The x-axis shows the position of the cable sample. This allows the user to visualize the spacing of the conductors 208 in the cable sample 108 by looking at the trough positions in order to quickly estimate trough position.

Figure 4B:
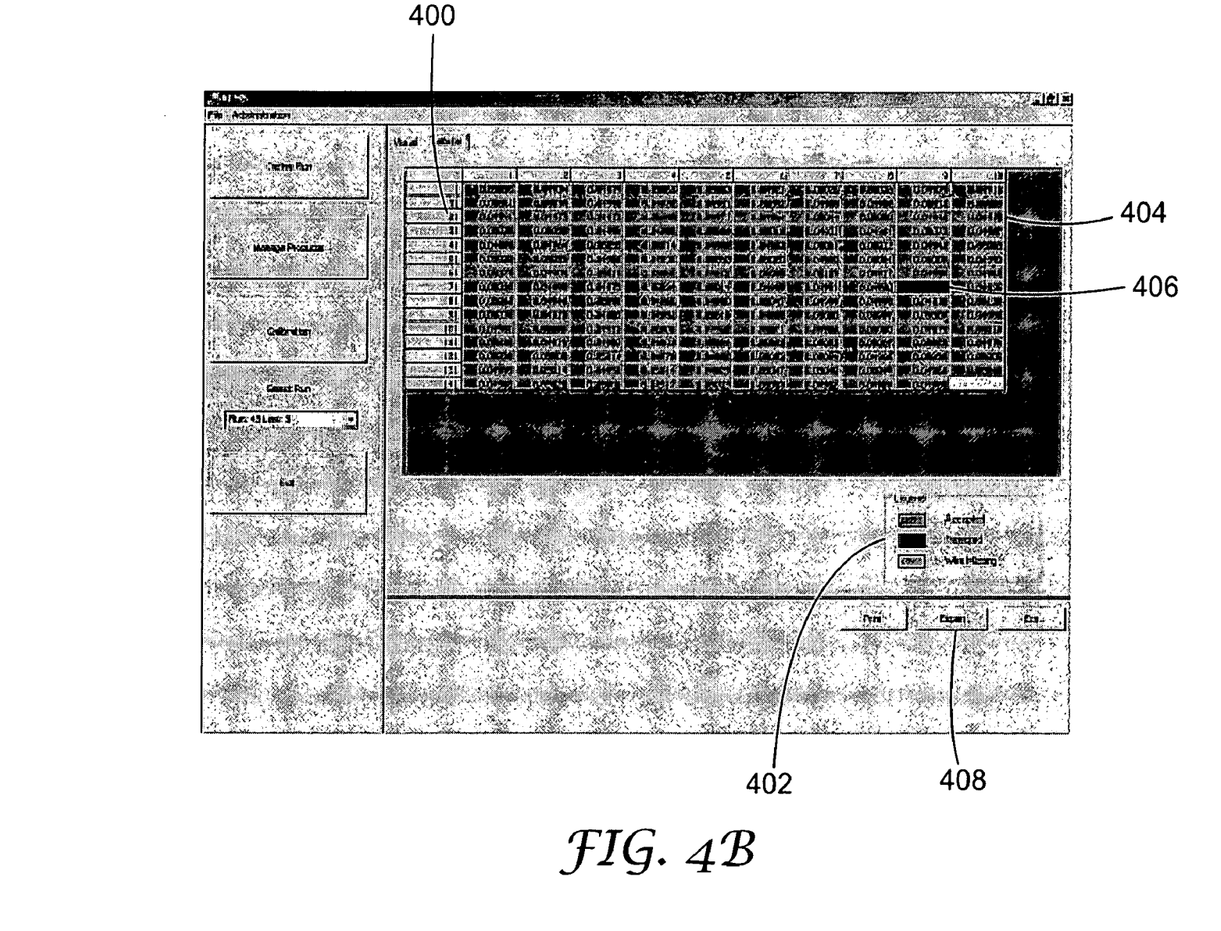
FIG. 4B illustrates a user interface display showing the tabular data collected by the advanced cable metrology system.

FIG. 4B illustrates a user interface display showing the tabular data collected by the ACM system 100. Raw data that has been processed by the computer system 106 can be presented in several formats according to the needs of the ACM system 100 user. From the Reporting/Measurement Interface of the ACM system 100, the user can select a data presentation format options tab 400. The table shows individual conductor spacing at different cable locations. This display allows a user to quickly detect conductors that fall within acceptable limits. The table cells are color coded according to a legend 402 to indicate if center to center distance values meet acceptable tolerances. For example, green cells 404 indicate conductors with acceptable tolerances, while red cells 406 indicate values outside of acceptable tolerances. Users can export and save data to an external computer system by utilizing an "Export" feature 408 of the system 100.

Figure 4C:
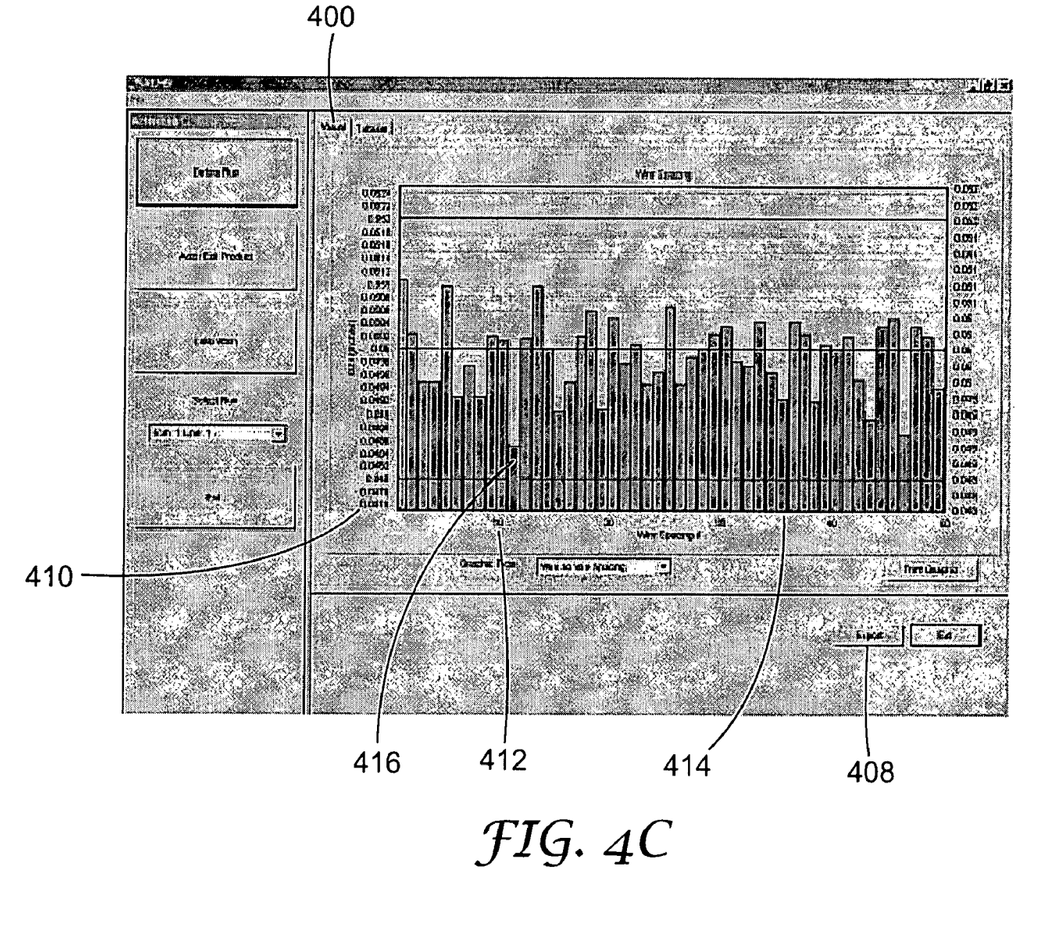
FIG. 4C illustrates a user interface display showing a bar graph of the data collected by the advanced cable metrology system.

FIG. 4C illustrates a user interface display showing the data collected by the ACM system 100. From the Reporting/Measurement Interface of the ACM system 100, the user can select the data presentation format options tab 400. The table shows individual conductor spacing 410 at different cable locations 412 in a bar chart format. This display allows a user to quickly detect conductors that fall within acceptable limits. The bars are color coded to indicate if center to center distance values meet acceptable tolerances. For example, green bars 414 indicate values outside of acceptable tolerances and red bars 416 indicate values outside of acceptable tolerances. Data can be displayed to show deviation from the specification and deviation from the mean. Users can export and saved data to an external computer system by utilizing an "Export" feature 408 of the ACM system 100.

Figure 4D:
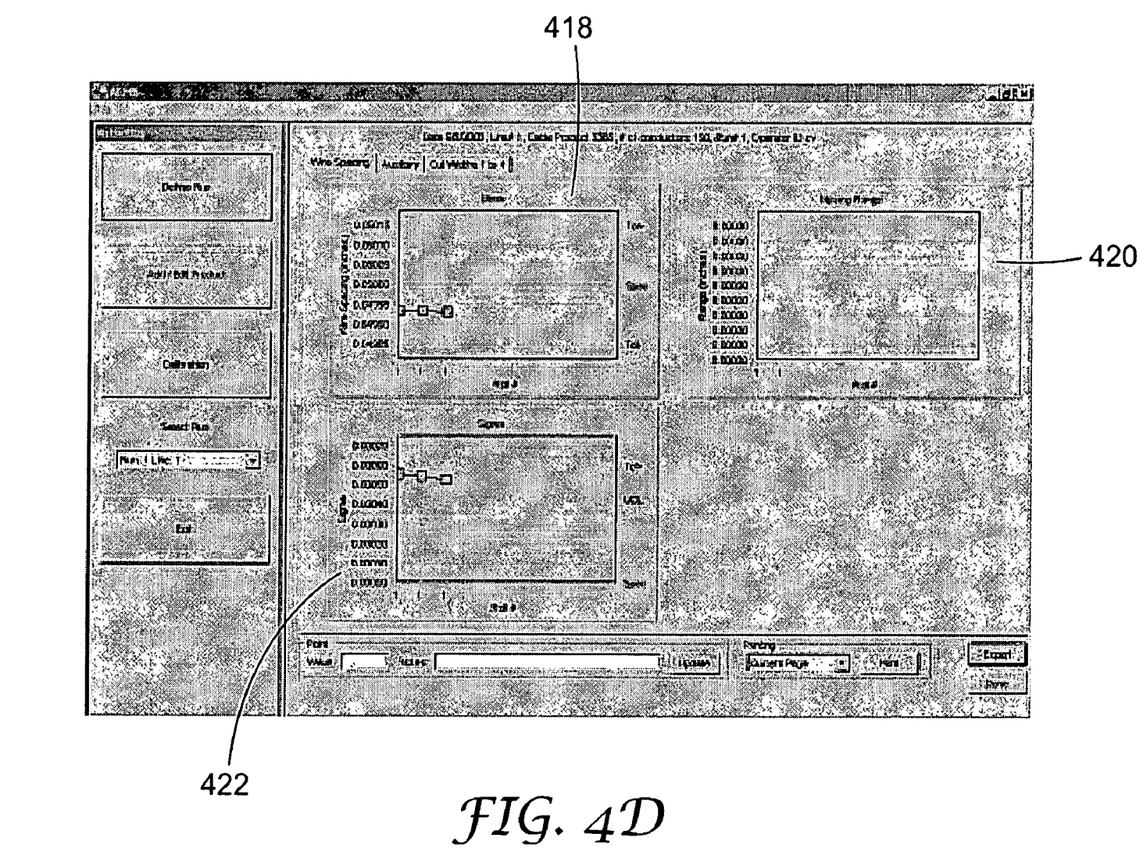
FIG. 4D illustrates a user interface display showing the display of the control panel for the Statistical Process Control charting capabilities of the advanced cable metrology system.

FIG. 4D illustrates a user interface display showing the display of the control panel for the Statistical Process Control (SPC) charting capabilities of the ACM system 100. Data from the histograms of FIG. 4B and FIG. 4C can be processed using SPC charting software. Mean 418, Moving Range 420, and Sigma 422 charts for the conductor spacing data can be displayed from the digitized and processed data.

Figure 4E:
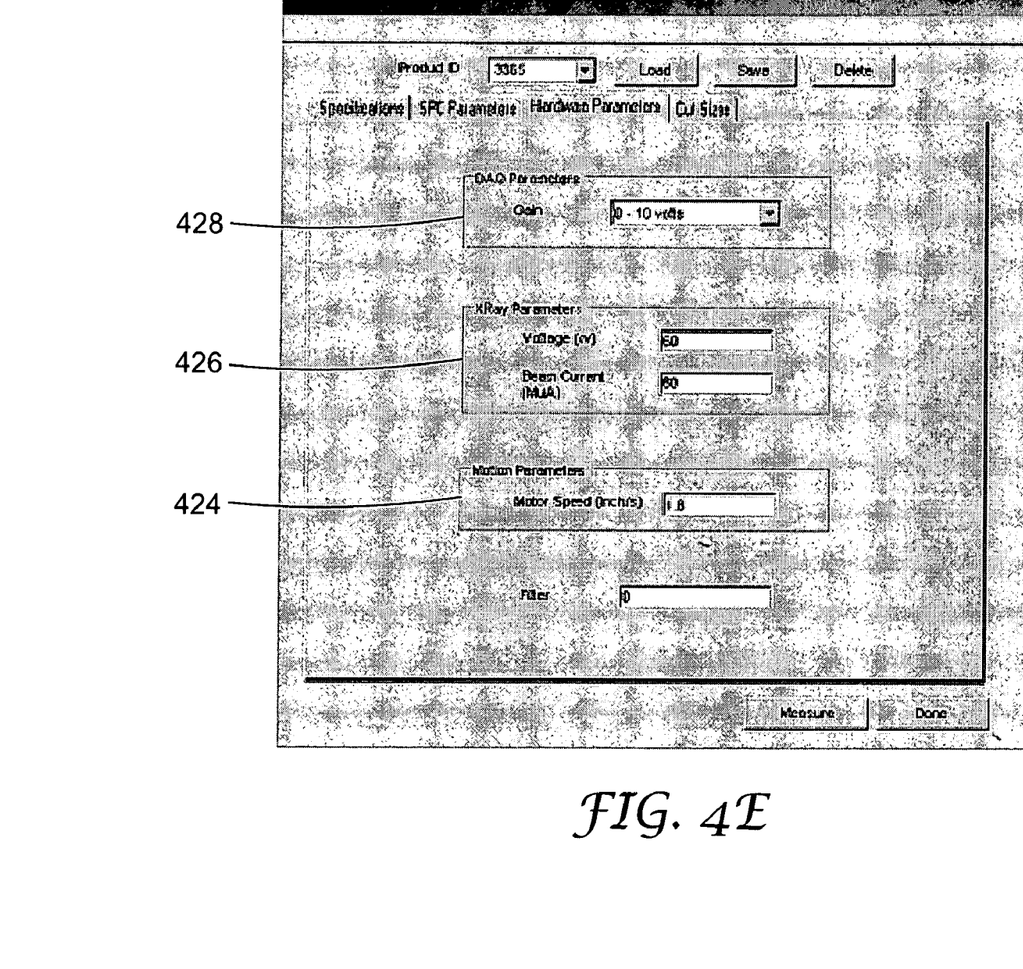
FIG. 4E illustrates a user interface display showing the X-ray and motion control input display of the advanced cable metrology system.

FIG. 4E illustrates a user interface display showing the X-ray and motion control input display of the ACM system 100. This panel enables the user of the ACM system 100 to select the parameters the ACM system 100 will employ when scanning the cable sample 108. This display shows the motion parameter 424 which controls the speed of the linear motion system 204. The user can specify motor speed in inches per second. This parameter determines the speed at which the motion control system 204 will move the sample stage assembly 104 through the photon beam 206. The display also shows the X-ray parameters 426 of voltage and beam current. These parameters determine the initial strength of the photon beam 206. The user can specify the X-ray voltage in kilo-volts and the beam current in microamps. The DAQ parameters 428 can also be selected by the user. This determines the settings for the gain setting for the data acquisition board of the computer system 106.

The present invention is able to accurately determine the center to center conductor spacing in insulated, multi-conductor, flat cable such as ribbon cable. The method of the present invention determines center to center spacing in a cable by determining the trough location of a waveform representing the intensity of an X-ray passing through the cable versus the cable position. This is done by averaging calculated position values for the center of the conductor at several locations across a cross section of the conductor. The ACM system 100 of the present invention uses improved components to increase the resolution and repeatability of the metrology system. By using a stationary X-ray generator with a spot size of five microns, a detector aperture, a long focal length, and a servo-motor positioner with a linear stage, the ACM system 100 is able to measure conductors having center to center spacing as small as 0.025 inch. The ACM system 100 utilizes enhanced user controls to further improve the accuracy of the measurements. The user is able to specify filtering operations to eliminate noise from the data readings. The user can also control the X-ray intensity settings and motion control speed to control test runs. Additionally, the user can store, organize and export data. The ACM system 100 utilizes statistical process control software to generate quality control charts of the data obtained.

Although the present invention has been described with reference to preferred embodiments, workers skilled in the art will recognize that changes may be made in form and detail without departing from the spirit and scope of the invention.

The invention claimed is:

1. A method for determining center to center spacing of conductors in an insulated, multi-conductor, flat cable, the method comprising:
   applying an X-ray field to the cable;
   detecting an X-ray intensity that passes through the conductors;
   obtaining a digitized output waveform of the X-ray intensity as a function of cable position;
   determining a trough location of the digitized output waveform by averaging calculated position values for a center of the conductor at several longitudinal positions along a conductor cross section;
   measuring the distance between adjacent determined trough positions on the digitized output waveform to determine the center to center spacing of the conductors in the insulated, multi-conductor, flat cable; and presenting to a user data representing the center to center spacing of the conductors.

2. The method of claim 1 wherein the conductor cross section where the longitudinal positions of the conductor are located is spaced away from the trough location of the digitized output waveform.

3. The method of claim 1 wherein the calculated position values are determined by:
   calculating a mean value of the X-ray intensity for a plurality of oscillations of the digitized output waveform;
   calculating a range of the digitized output waveform by subtracting a minimum X-ray intensity value from the mean value;
   calculating an upper intensity level from the minimum X-ray intensity value and the range;
   calculating a lower intensity level from the minimum X-ray intensity value and the range; selecting a plurality of longitudinal positions between the upper intensity level and the lower intensity level;
   determining a pair of y-axis values where the digitized output waveform intersects each of the longitudinal positions;
   determining x-axis values for each pair of y-axis values for each longitudinal position; and
   averaging the x-axis values of each pair of y-axis values to obtain a calculated position value for each longitudinal position.

4. The method of claim 3 wherein the upper intensity level is equal to sixty percent of the range plus the minimum X-ray intensity.

5. The method of claim 3 wherein the lower intensity level is equal to twenty percent of the range plus the minimum X-ray intensity.

6. The method of claim 3 wherein the upper intensity level is located on a portion of the digitized output waveform where the X-ray intensity versus the cable position exhibits a high rate of change.

7. The method of claim 3 wherein the lower intensity level is located on a position of the digitized output waveform where the X-ray intensity versus the cable position exhibits a high rate of change.

8. A method for determining center to center spacing of conductors in an insulated, multi-conductor, flat cable from a waveform display showing X-ray intensity versus cable position, the method comprising:
   calculating a mean value of the X-ray intensity for a plurality of oscillations of the waveform;
   calculating a range of the waveform by subtracting a minimum X-ray intensity from the mean value;
   calculating an upper intensity level from the mean value and the range;
   calculating a lower intensity level from the mean value and the range;
   selecting a plurality of longitudinal positions between the upper intensity level and the lower intensity level;
   determining a pair of y-axis values where the waveform intersects each of the longitudinal positions;
   determining x-axis values for each pair of y-axis values for each longitudinal position;
   averaging the x-axis values of each pair of y-axis values to obtain a calculated center position value for each longitudinal position;
   averaging the calculated center position values for each longitudinal position to obtain a trough location on the waveform;
   measuring the distance between adjacent trough locations on the waveform to determine the center to center spacing of the conductors in the insulated, multi-conductor, flat cable; and presenting to a user data representing the center to center spacing of the conductors.

9. A system for measuring center to center spacing of conductors in an insulated, multi-conductor, flat cable, the system comprising:
   an X-ray generator for applying an X-ray beam to the cable;
   an X-ray detector for detecting an X-ray intensity emerging from the cable opposite the X-ray generator;
   a motion control system for controlling movement of the cable through the X-ray beam;
   a processing system for obtaining a digitized output waveform of the X-ray intensity versus the cable position, and for electronically determining a trough location of the digitized output waveform by averaging calculated position values for a center of the conductor at several longitudinal positions along a conductor cross section and then measuring a distance between adjacent trough positions on the digitized output waveform; and
   a user interface system for processing data representing the digitized output waveform and controlling the components of the system.

10. The system of claim 9 wherein the calculated position values are determined by:
    calculating a mean value of the X-ray intensity for a plurality of oscillations of the digitized output waveform;

calculating a range of the digitized output waveform by subtracting a minimum X-ray intensity value from the mean value;

calculating an upper intensity level from the mean value and the range;

calculating a lower intensity level from the mean value and the range;

selecting a plurality of longitudinal positions between the upper intensity level and the lower intensity level;

determining a pair of y-axis values where the digitized output waveform intersects each of the longitudinal positions;

determining x-axis values for each pair of y-axis values for each longitudinal position; and averaging the x-axis values of each pair of y-axis values to obtain a calculated position value for each longitudinal position.

11. The system of claim 9 wherein the cable is ribbon cable with solid wire construction.

12. The system of claim 9 wherein the cable is ribbon cable with stranded wire construction.

13. The system of claim 9 wherein the X-ray generator is an X-ray tube.

14. The system of claim 9 wherein the X-ray detector is a silicon photodiode covered by a scintillator.

15. The system of claim 9 wherein the motion control system comprises of a servo-motor positioner and a linear stage.

16. The system of claim 9 wherein the processing system and the user interface system for processing data representing the digitized output waveform are implemented in a computer system.

17. The system of claim 16 wherein the computer system is capable of sorting and visually displaying the data representing the digitized output waveform.

18. The system of claim 16 wherein the computer system comprises a display screen and a pointing device.

19. The system of claim 16 wherein the computer system allows the user to specify parameters for generating the X-ray and parameters for controlling the cable position relative to the X-ray.

20. The system of claim 16 wherein the computer system is capable of saving and exporting data representing the digitized output waveform.

21. The system of claim 9 wherein the user interface system for processing data representing the digitized output waveform comprises statistical process control software.

22. A system for measuring center to center spacing of conductors in an insulated, multi-conductor, flat cable, the system comprising:

an X-ray generator for applying an X-ray to the cable;

an X-ray detector for detecting an X-ray intensity emerging from the cable opposite the X-ray generator, the X-ray detector having an aperture for controlling entry into the X-ray detector of the X-ray intensity emerging from the cable opposite the X-ray generator, wherein the aperture has a length and a width with a ratio of length to width in a range from five to twenty-five;

a motion control system for controlling movement of the cable through the X-ray; and a computer system for obtaining a digitized output waveform of the X-ray intensity versus a cable position, and for electronically determining a trough location of the digitized output waveform by averaging calculated position values for a center of a conductor at several longitudinal positions along a conductor cross section, and then measuring the distance between adjacent trough positions on the digitized output waveform.

23. The system of claim 22 wherein the ratio of length to width of the aperture equals seven.

24. A method for determining center to center spacing of conductors in an insulated, multi-conductor, flat cable, the method comprising:

applying an X-ray field to the cable to produce an X-ray intensity beam emerging from the cable;

controlling with an aperture a length to width aspect ratio of the X-ray intensity beam that enters a detector, wherein the length to width aspect ratio of the aperture is in a range between five and twenty-five;

detecting a controlled X-ray intensity beam emerging from the cable after the X-ray field has been applied to the cable;

obtaining a digitized output waveform of the controlled X-ray intensity beam as a function of cable position;

determining a trough location of the digitized output waveform by averaging calculated position values for a center of a conductor at several longitudinal positions along a conductor cross section, and then measuring the distance between adjacent trough positions on the digitized output waveform to determine the center to center spacing of the conductors in the insulated, multi-conductor, flat cable; and presenting to a user data representing the center to center spacing of the conductors.

* * * * *

UNITED STATES PATENT AND TRADEMARK OFFICE
CERTIFICATE OF CORRECTION

PATENT NO. : 7,191,091 B2 Page 1 of 1
APPLICATION NO. : 11/000631
DATED : March 13, 2007
INVENTOR(S) : Donald E. Yuhas

It is certified that error appears in the above-identified patent and that said Letters Patent is hereby corrected as shown below:

Column 5
Line 15, equation 8, delete "$P_{through}$" and insert --$P_{trough}$-- therefore Column 9
Line 49, in Claim 22, delete "fiat" and insert -- flat --, therefore Signed and Sealed this Nineteenth Day of June, 2007

JON W. DUDAS
*Director of the United States Patent and Trademark Office*